(12) United States Patent
Wang et al.

(10) Patent No.: US 8,516,927 B1
(45) Date of Patent: Aug. 27, 2013

(54) SOCKET WRENCH WITH AN ENERGY-SAVING FUNCTION

(71) Applicants: Yen-Hui Wang, Taichung (TW); Sin-Heng Wang, Taichung (TW); Chin-He Wang, Taichung (TW)

(72) Inventors: Yen-Hui Wang, Taichung (TW); Sin-Heng Wang, Taichung (TW); Chin-He Wang, Taichung (TW)

( * ) Notice: Subject to any disclaimer, the term of this patent is extended or adjusted under 35 U.S.C. 154(b) by 0 days.

(21) Appl. No.: 13/663,567

(22) Filed: Oct. 30, 2012

(51) Int. Cl.
*B25B 13/46* (2006.01)
*B25B 23/142* (2006.01)
*B25B 23/159* (2006.01)
*B25B 13/00* (2006.01)
*B25B 13/10* (2006.01)
*B25F 1/00* (2006.01)
*B25F 1/02* (2006.01)
*B25F 1/04* (2006.01)

(52) U.S. Cl.
USPC ............... 81/62; 7/140; 7/167; 7/168; 7/170; 81/437; 81/52; 81/429; 81/473; 81/475; 81/477; 81/478; 81/481; 81/483; 81/58

(58) Field of Classification Search
USPC ............... 81/62, 52, 429, 473, 475, 477, 478, 81/481, 483, 58, 437; 7/140, 167, 168, 170
See application file for complete search history.

(56) References Cited

U.S. PATENT DOCUMENTS

| | | | |
|---|---|---|---|
| 7,587,961 B1 * | 9/2009 | Chiang | 81/62 |
| 8,250,947 B2 * | 8/2012 | Hu | 81/63.1 |
| 2009/0007731 A1 * | 1/2009 | Chen | 81/62 |

* cited by examiner

*Primary Examiner* — Lee D Wilson
*Assistant Examiner* — Danny Hong
(74) *Attorney, Agent, or Firm* — Alan Kamrath; Kamrath IP Lawfirm, P.A.

(57) ABSTRACT

A socket wrench includes a handle having a housing and a grip portion, a drive shank having a ratchet wheel mounted in the housing, two pawl members engaged with the ratchet wheel, a switching member located between the pawl members, two elastic members each biased between the housing and the respective pawl member, a control knob connected with the switching member, a driven arm having a mounting sleeve and an arcuate mounting slot, a connecting plate provided on the handle, and two driving arms provided on the connecting plate and received in the mounting slot. When in use, one of the driving arms drives the driven arm by a leverage to drive the drive shank to rotate a socket so as to operate a workpiece in an energy-saving manner.

5 Claims, 8 Drawing Sheets

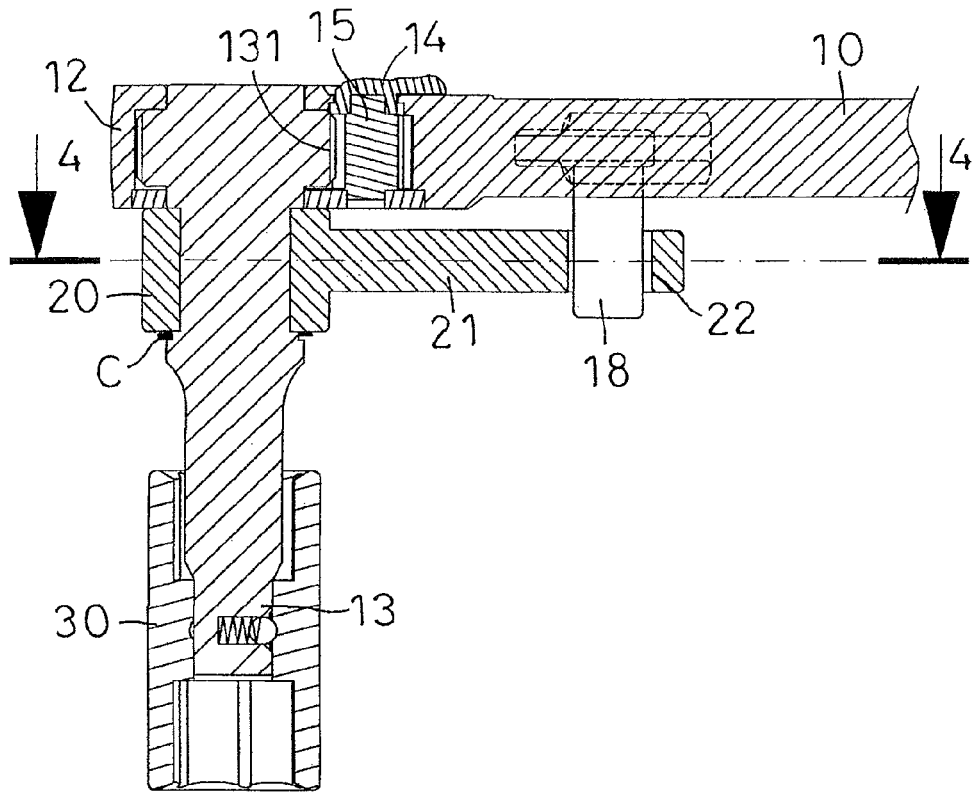
F I G. 3
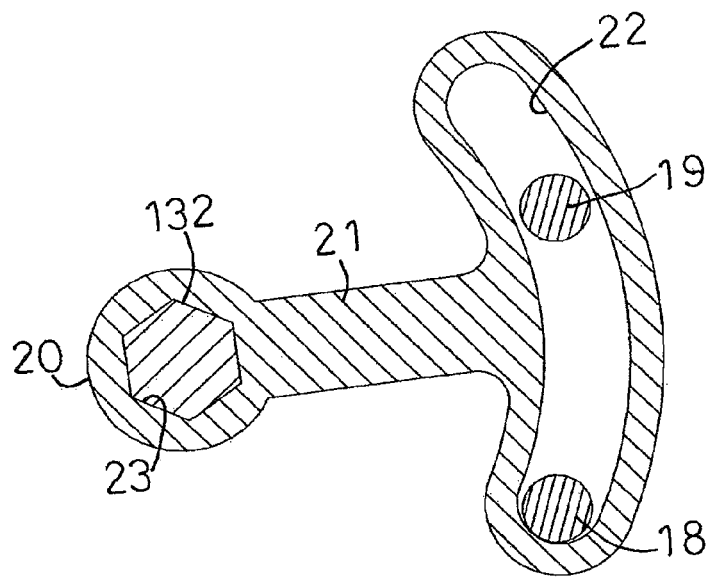
F I G. 4

SOCKET WRENCH WITH AN ENERGY-SAVING FUNCTION

BACKGROUND OF THE INVENTION

1. Field of the Invention

The present invention relates to a hand tool and, more particularly, to a socket wrench for operating a workpiece, such as a bolt, screw and the like.

2. Description of the Related Art

A conventional socket wrench is used to operate (screw or unscrew) a workpiece, such as a bolt, screw and the like. Thus, a user can operate the socket wrench to screw a bolt onto a tire or to unscrew the bolt from the tire. However, the conventional socket wrench does not have an energy-saving mechanism so that it is necessary to apply a larger force on the socket wrench to drive and unscrew the bolt from the tire. Thus, a user with a smaller strength cannot drive and unscrew the bolt easily when the bolt is locked too tightly and closely, thereby wasting the user's force and energy, and thereby easily causing inconvenience when unscrewing the bolt.

BRIEF SUMMARY OF THE INVENTION

In accordance with the present invention, there is provided a socket wrench, comprising a handle having a first end provided with a housing and a second end provided with a grip portion, a drive shank having a first end provided with a ratchet wheel mounted in the housing of the handle, two pawl members pivotally mounted in the housing of the handle and engaged with the ratchet wheel of the drive shank, a switching member rotatably mounted in the housing of the handle and located between the pawl members, two elastic members each mounted in the housing of the handle and each biased between the housing of the handle and a respective one of the pawl members, a control knob rotatably mounted on the housing of the handle and connected with the switching member, a driven arm having a first end provided with a mounting sleeve secured on the drive shank and a second end provided with an arcuate mounting slot, a connecting plate provided on the handle, two driving arms provided on the connecting plate and received in the mounting slot of the driven arm, and a snap ring secured on the drive shank and abutting the mounting sleeve of the driven arm. The driving arms are located at two opposite ends of the connecting plate. The drive shank has a periphery provided with a polygonal connecting portion. The mounting sleeve of the driven arm has an interior provided with a polygonal mounting hole mounted on the connecting portion of the drive shank. The control knob drives the switching member to pivot the pawl members so that one of the pawl members provides a oneway ratcheting function to the ratchet wheel of the drive shank, and the housing of the handle drives the ratchet wheel of the drive shank in one direction only so as to operate (screw or unscrew) a workpiece. The mounting sleeve is located under the housing of the handle. The snap ring is located under the mounting sleeve of the driven arm.

The socket wrench further comprises a socket mounted on the drive shank. The drive shank has a second end protruding outward from the housing of the handle. The socket has a first end mounted on the second end of the drive shank and a second end mounted on the workpiece.

The primary objective of the present invention is to provide a socket wrench with an energy-saving function.

According to the primary advantage of the present invention, one of the driving arms drives the driven arm by a leverage to drive the socket so as to operate the workpiece in an energy-saving manner so that a user having smaller strength can tighten or loosen the workpiece easily and conveniently, thereby saving the user's force and energy.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 3 is a front cross-sectional view of the socket wrench as shown in FIG. 1.

FIG. 4 is a cross-sectional view of the socket wrench taken along line 4-4 as shown in FIG. 3.

DETAILED DESCRIPTION OF THE INVENTION

Figure 1:
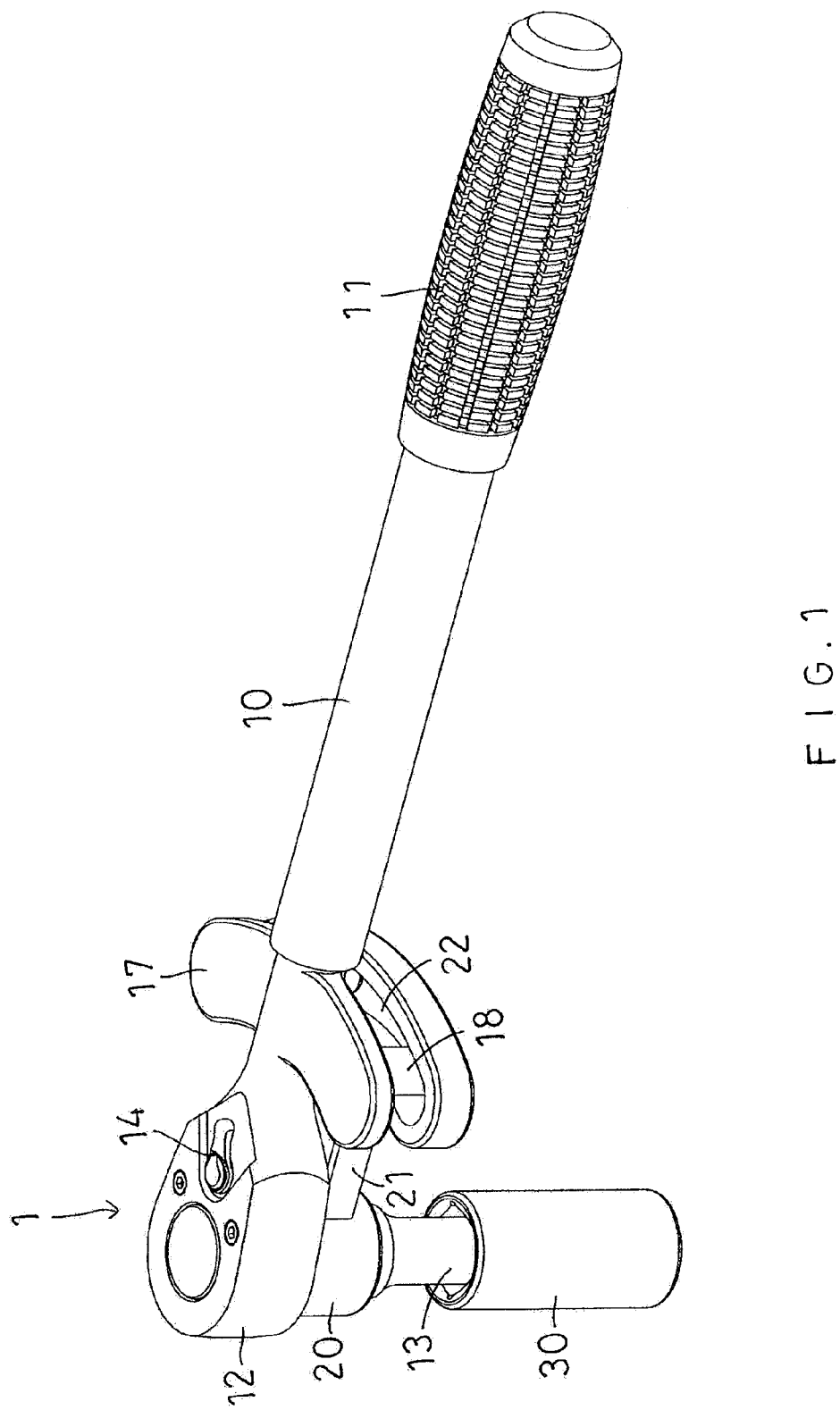
FIG. 1 is a perspective view of a socket wrench in accordance with the preferred embodiment of the present invention.
Figure 2:
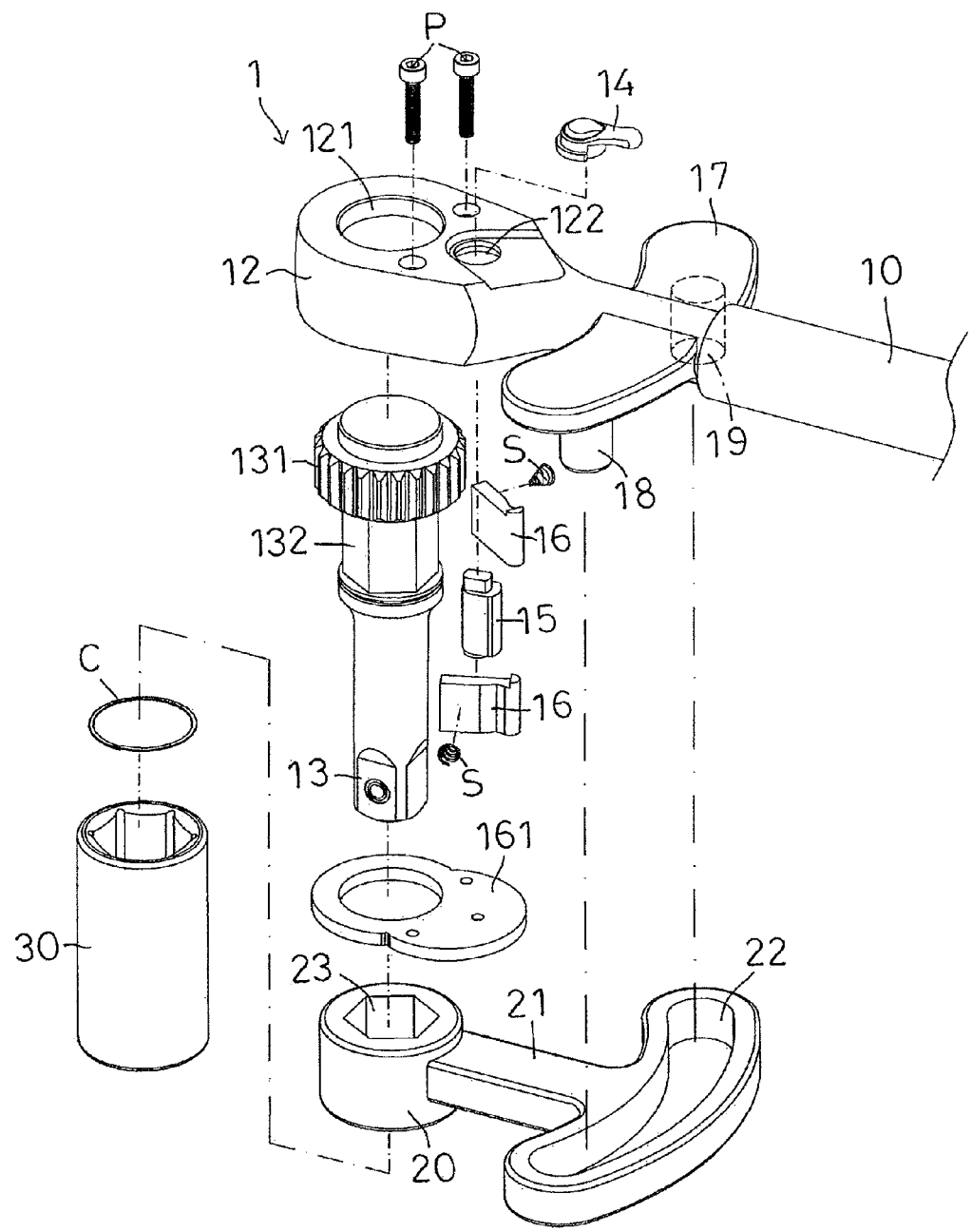
FIG. 2 is an exploded perspective view of the socket wrench as shown in FIG. 1.
Figure 5:
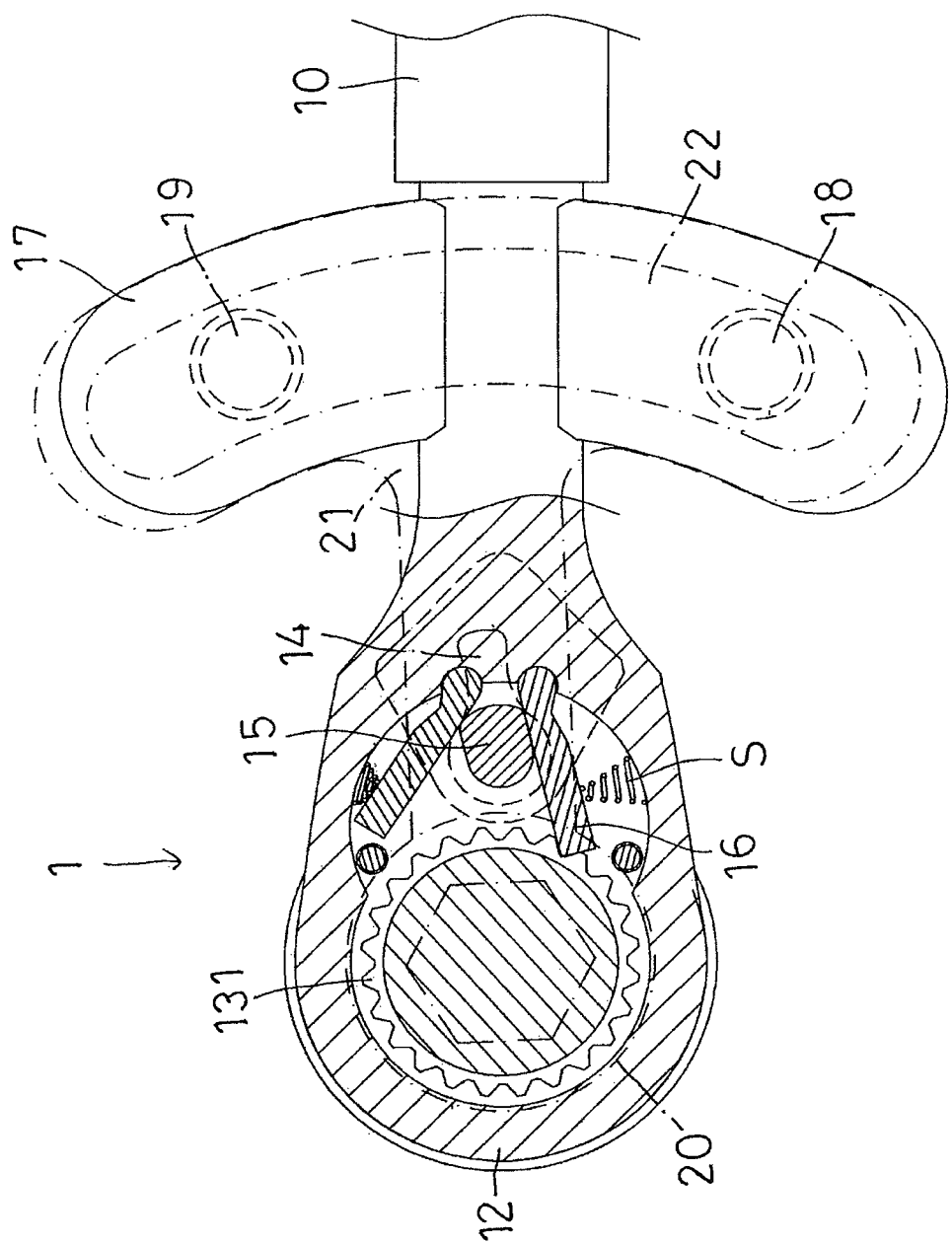
FIG. 5 is a top cross-sectional view of the socket wrench as shown in FIG. 1.

Referring to the drawings and initially to FIGS. 1-5, a socket wrench 1 in accordance with the preferred embodiment of the present invention comprises a handle 10 having a first end provided with a housing 12 and a second end provided with a grip portion 11, a drive shank 13 having a first end provided with a ratchet wheel 131 mounted in the housing 12 of the handle 10, two pawl members 16 pivotally mounted in the housing 12 of the handle 10 and engaged with the ratchet wheel 131 of the drive shank 13, a switching member 15 rotatably mounted in the housing 12 of the handle 10 and located between the pawl members 16, two elastic members "S" each mounted in the housing 12 of the handle 10 and each biased between the housing 12 of the handle 10 and a respective one of the pawl members 16, a control knob 14 rotatably mounted on the housing 12 of the handle 10 and connected with the switching member 15, a driven arm 21 having a first end provided with a mounting sleeve 20 secured on the drive shank 13 and a second end provided with an arcuate mounting slot 22, a connecting plate 17 provided on the handle 10, two driving arms 18 and 19 provided on the connecting plate 17 and received in the mounting slot 22 of the driven arm 21, a snap ring "C" secured on the drive shank 13 and abutting the mounting sleeve 20 of the driven arm 21, and a bottom plate 161 mounted on the housing 12 of the handle 10 and abutting the ratchet wheel 131 of the drive shank 13 to prevent the ratchet wheel 131 of the drive shank 13 from being detached from the housing 12 of the handle 10.

The handle 10 has a fixed length or has a telescopically adjustable structure. The housing 12 of the handle 10 has an interior provided with a receiving chamber 121 for receiving the ratchet wheel 131 of the drive shank 13 and provided with a receiving space 122 for receiving the switching member 15, the pawl members 16 and the elastic members "S". The receiving space 122 of the housing 12 is connected to the receiving chamber 121. The control knob 14 is partially received in the receiving space 122 of the housing 12.

The connecting plate 17 is located beside the housing 12 of the handle 10 and has an arcuate shape to matching that of the mounting slot 22 of the driven arm 21. The driving arms 18 and 19 are located at two opposite ends of the connecting plate 17.

The drive shank 13 has a second end protruding outward from the housing 12 of the handle 10. The drive shank 13 has a periphery provided with a polygonal connecting portion 132. Preferably, the connecting portion 132 of the drive shank 13 has a hexagonal shape. The connecting portion 132 of the drive shank 13 is located under the ratchet wheel 131.

A socket 30 is mounted on the drive shank 13. The socket 30 has a first end mounted on the second end of the drive shank 13 and a second end mounted on a workpiece, such as a bolt, screw and the like.

The mounting sleeve 20 of the driven arm 21 is located under the bottom plate 161 and the housing 12 of the handle 10. The mounting sleeve 20 of the driven arm 21 has an interior provided with a polygonal mounting hole 23 mounted on the connecting portion 132 of the drive shank 13. Preferably, the mounting hole 23 of the mounting sleeve 20 has a hexagonal shape. The snap ring "C" is located under the mounting sleeve 20 of the driven arm 21.

The control knob 14 drives the switching member 15 to pivot the pawl members 16 so that one of the pawl members 16 provides a one-way ratcheting function to the ratchet wheel 131 of the drive shank 13, and the housing 12 of the handle 10 drives the ratchet wheel 131 of the drive shank 13 in one direction only so as to operate (screw or unscrew) the workpiece.

The bottom plate 161 is located between the ratchet wheel 131 of the drive shank 13 and the mounting sleeve 20 of the driven arm 21. The bottom plate 161 is fixed on a bottom of the housing 12 of the handle 10 by two fastening bolts "P" to cover the receiving chamber 121 and the receiving space 122 of the housing 12. The bottom plate 161 abuts the switching member 15, the pawl members 16 and the elastic members "S" to prevent the switching member 15, the pawl members 16 and the elastic members "S" from being detached from the housing 12 of the handle 10.

Figure 6:
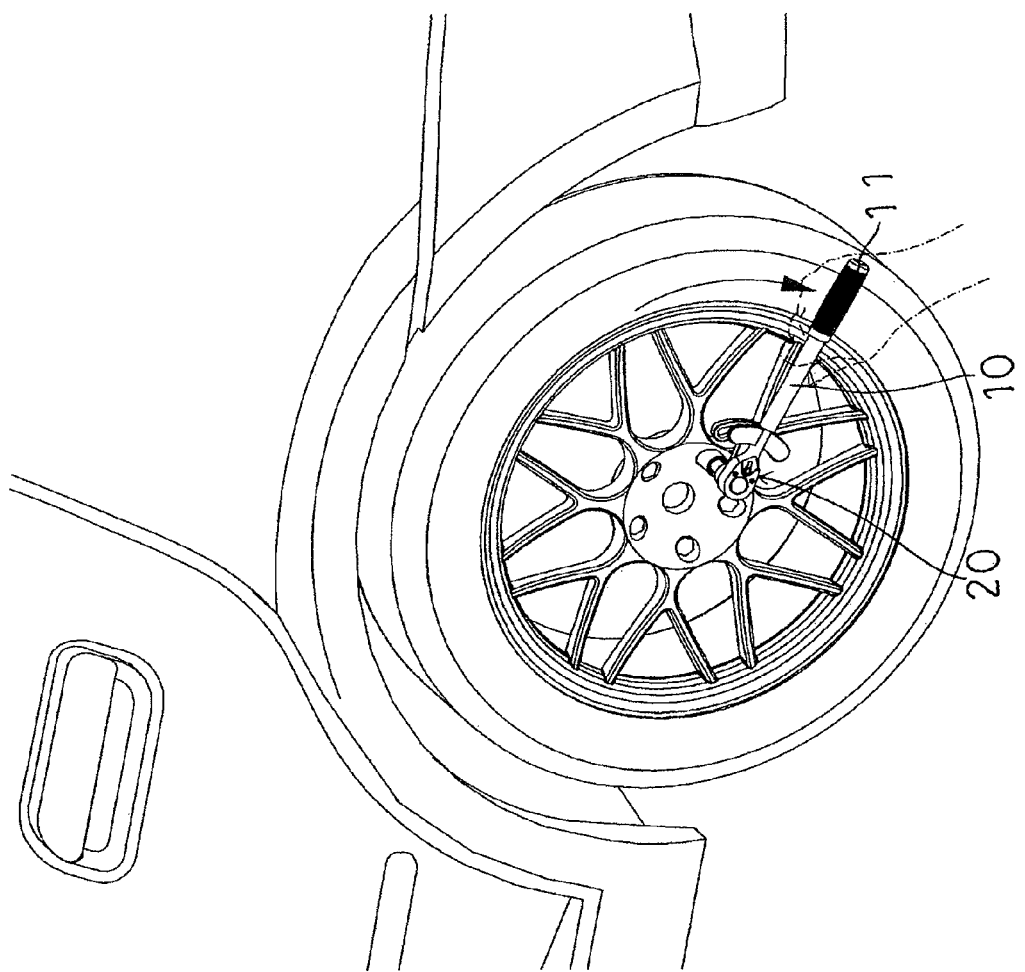
FIG. 6 is a schematic operational view of the socket wrench as shown in FIG. 1 in use.
Figure 7:
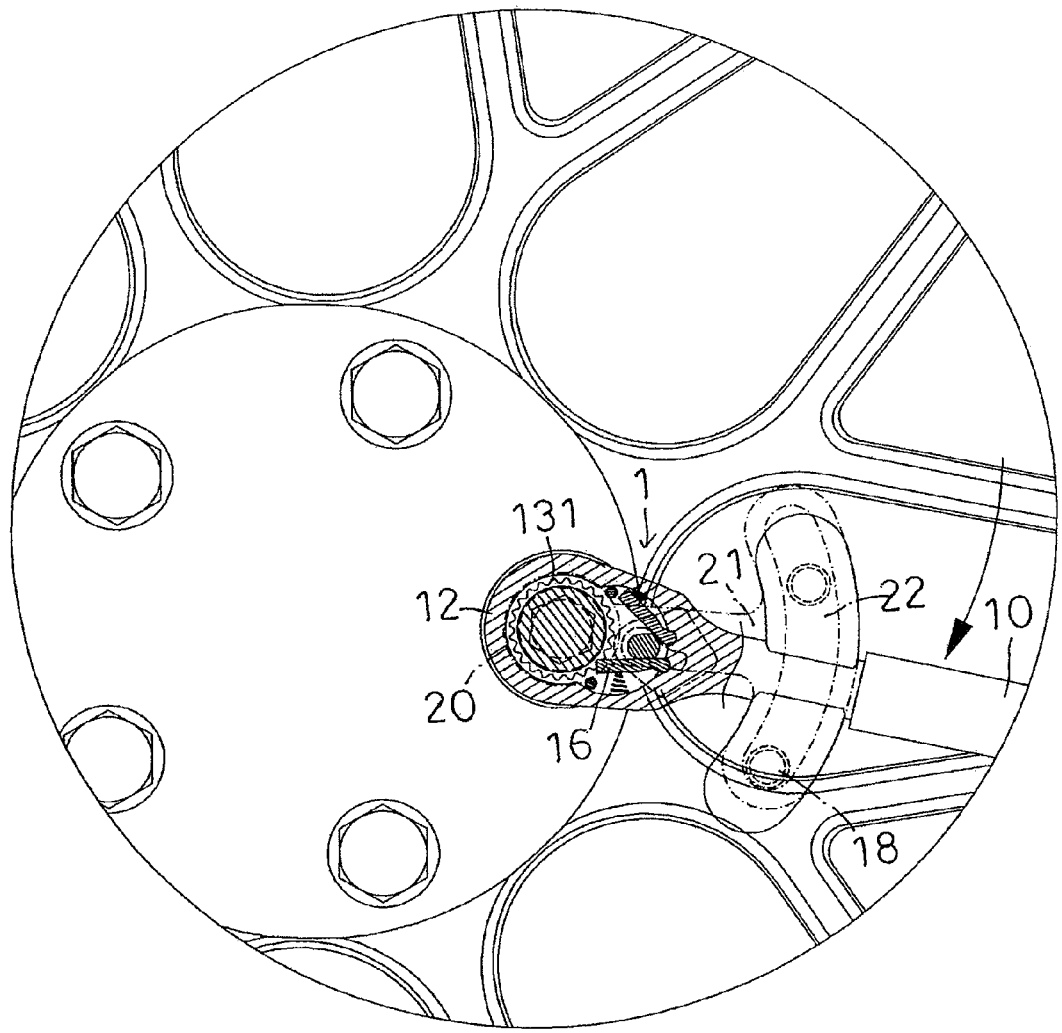
FIG. 7 is a front cross-sectional view of the socket wrench as shown in FIG. 6.
Figure 8:
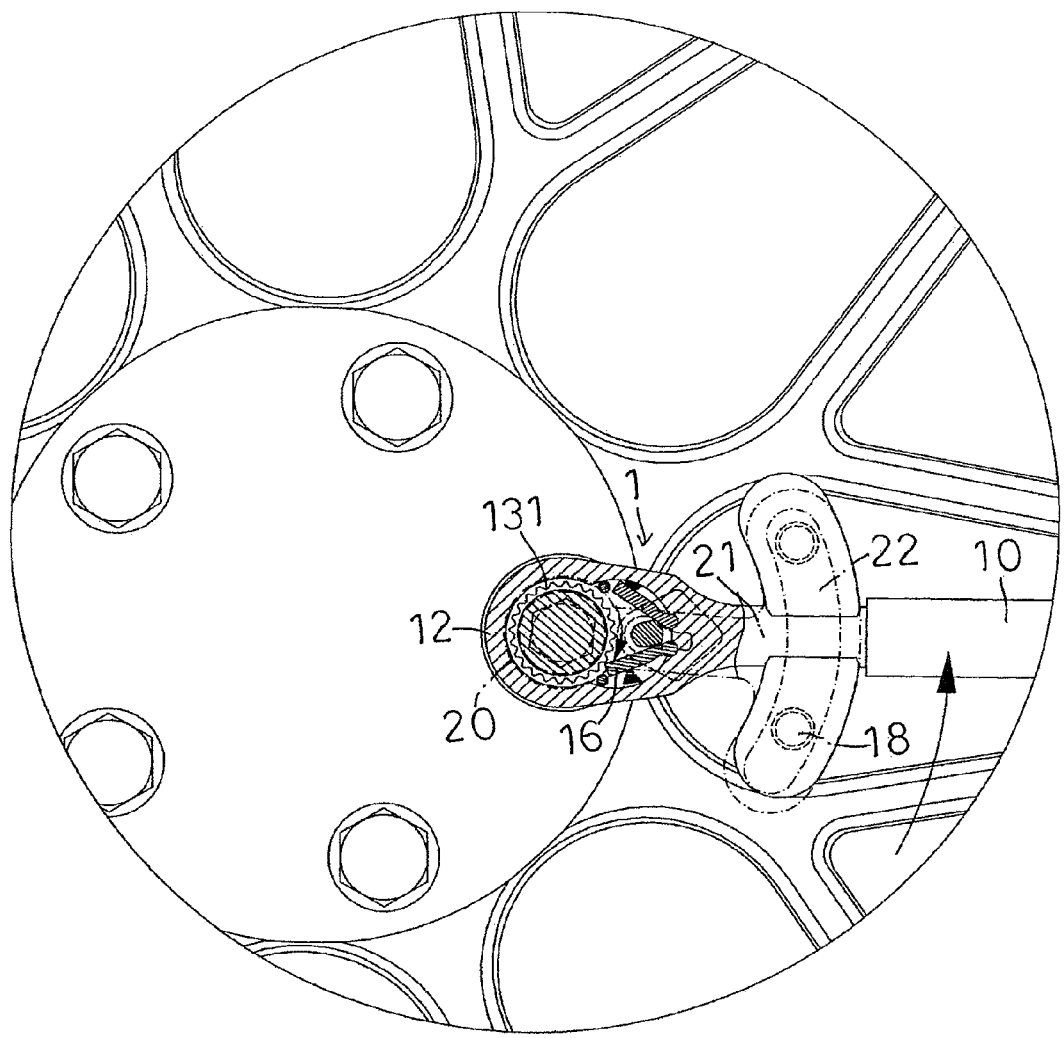
FIG. 8 is a front cross-sectional view of the socket wrench as shown in FIG. 7.
Figure 9:
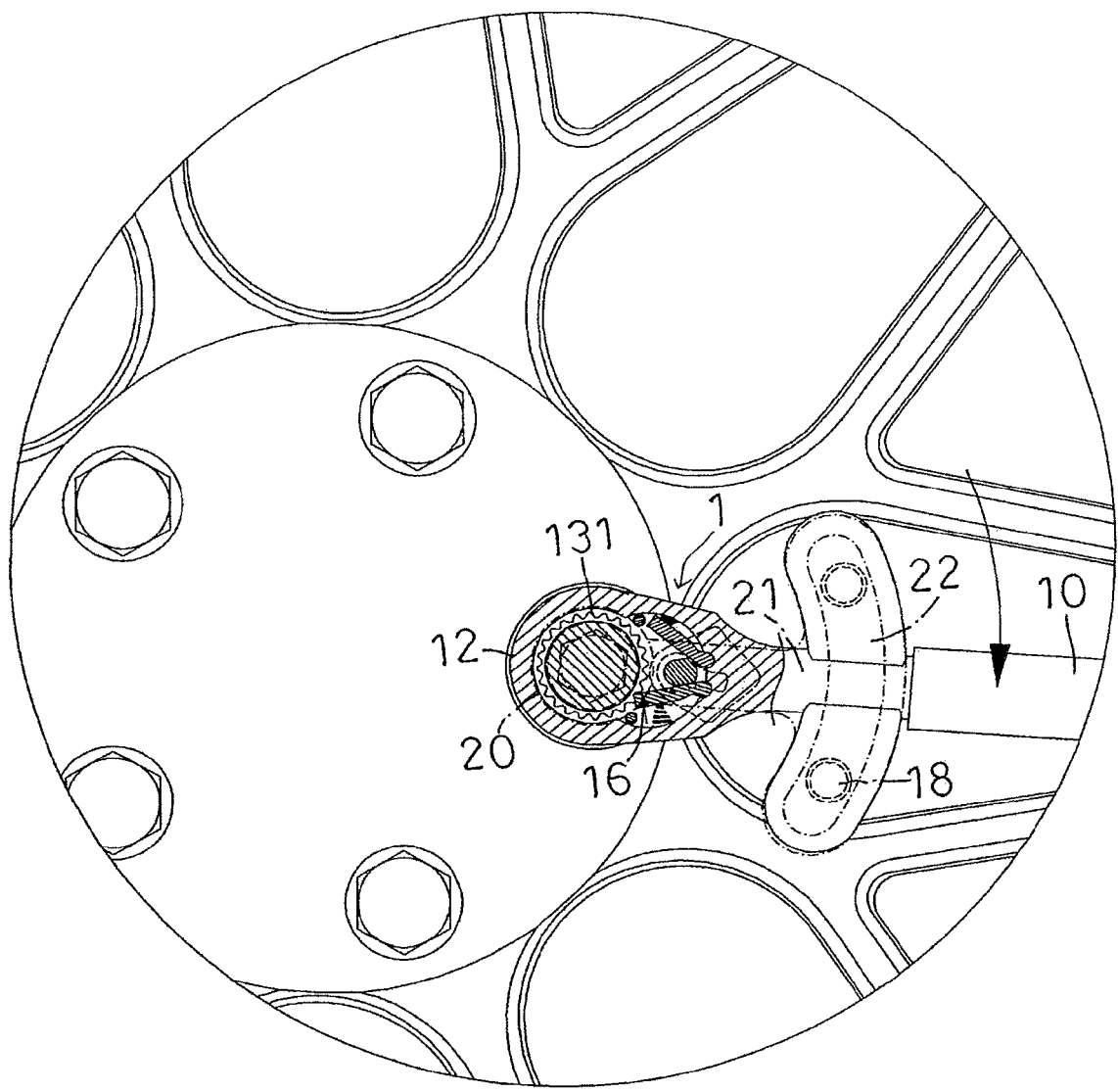
FIG. 9 is a front cross-sectional view of the socket wrench as shown in FIG. 8.

In operation, referring to FIGS. 6-9 with reference to FIGS. 1-5, one of the pawl members 16 engages the ratchet wheel 131 so that when the handle 10 is rotated in the first (clockwise) direction as shown in FIG. 6, the housing 12 is rotated to drive one of the pawl members 16 to drive the ratchet wheel 131 which drives the drive shank 13 which drives the socket 30 which drives the workpiece. Reversely, when the handle 10 is rotated in the second (counterclockwise) direction, one of the pawl members 16 skips the ratchet wheel 131 so that the handle 10 performs an idle rotation in the second (counterclockwise) direction. In such a manner, the handle 10 is rotated successively to rotate the workpiece in a oneway manner so as to tighten the workpiece on a tire. After the workpiece is fixed and cannot be rotated any more, the drive shank 13 is fixed so that the ratchet wheel 131 is fixed and cannot be rotated. At this time, when the handle 10 is further rotated, one of the driving arms 18 and 19 pushes the rim of the mounting slot 22 of the driven arm 21 as shown in FIG. 7 to rotate the driven arm 21 which rotates the mounting sleeve 20 which rotates the connecting portion 132 which rotates the drive shank 13 which drives the socket 30 which drives the workpiece so as to further tighten the workpiece exactly and closely. Thus, one of the driving arms 18 and 19 drives the driven arm 21 by a leverage to drive the socket 30 so as to tighten the workpiece in an energy-saving manner so that a user can tighten the workpiece easily and conveniently. When the handle 10 is rotated in the second (counterclockwise) direction as shown in FIG. 8, one of the pawl members 16 skips the ratchet wheel 131 so that the handle 10 performs an idle rotation in the second (counterclockwise) direction. When the handle 10 is rotated in the first (clockwise) direction as shown in FIG. 9, one of the pawl members 16 engages the ratchet wheel 131 again.

On the contrary, when the user wishes to loosen the workpiece, the control knob 14 drives the switching member 15 to pivot the pawl members 16 so that the other one of the pawl members 16 engages the ratchet wheel 131. At this time, the workpiece is fixed and cannot be rotated any more, and the drive shank 13 is fixed so that the ratchet wheel 131 is fixed and cannot be rotated. Therefore, when the handle 10 is rotated, the other one of the driving arms 18 and 19 pushes the rim of the mounting slot 22 of the driven arm 21 to rotate the driven arm 21 which rotates the mounting sleeve 20 which rotates the connecting portion 132 which rotates the drive shank 13 which drives the socket 30 which drives the workpiece so as to loosen the workpiece. Thus, the other one of the driving arms 18 and 19 drives the driven arm 21 by a leverage to drive the socket 30 so as to loosen the workpiece in an energy-saving manner so that a user with smaller strength can loosen the workpiece easily and conveniently. After the workpiece is loosened, the handle 10 is rotated successively to operate the workpiece. For example, when the handle 10 is rotated in the first (counterclockwise) direction, the housing 12 is rotated to drive the other one of the pawl members 16 to drive the ratchet wheel 131 which drives the drive shank 13 which drives the socket 30 which drives the workpiece. Reversely, when the handle 10 is rotated in the second (clockwise) direction, the other one of the pawl members 16 skips the ratchet wheel 131 so that the handle 10 performs an idle rotation in the second (clockwise) direction. In such a manner, the handle 10 is rotated successively to rotate the workpiece in a oneway manner so as to loosen and detach the workpiece from the tire.

Accordingly, one of the driving arms 18 and 19 drives the driven arm 21 by a leverage to drive the socket 30 so as to operate the workpiece in an energy-saving manner so that a user having smaller strength can tighten or loosen the workpiece easily and conveniently, thereby saving the user's force and energy.

In the preferred embodiment of the present invention, the center of the ratchet wheel 131 and one of the driving arms 18 and 19 define a first line, while the center of the ratchet wheel 131 and the other one of the driving arms 18 and 19 define a second line, wherein the angle between the first line and the second line is ranged between fifteen and twenty-five degrees (15-25°), so that the driving arms 18 and 19 can provide the optimum energy-saving effect. In addition, the center of the ratchet wheel 131 and any one of the driving arms 18 and 19 define a first length, while the handle 10 has a second length, wherein the ratio of the first length and the second length is ranged between one eighth and one ninth (⅛-⅑), so that the driving arms 18 and 19 can provide the optimum energy-saving effect.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A socket wrench, comprising:

a handle having a first end provided with a housing and a second end provided with a grip portion;

a drive shank having a first end provided with a ratchet wheel mounted in the housing of the handle;

two pawl members pivotally mounted in the housing of the handle and engaged with the ratchet wheel of the drive shank;

a switching member rotatably mounted in the housing of the handle and located between the pawl members;

two elastic members each mounted in the housing of the handle and each biased between the housing of the handle and a respective one of the pawl members;

a control knob rotatably mounted on the housing of the handle and connected with the switching member;

a driven arm having a first end provided with a mounting sleeve secured on the drive shank and a second end provided with an arcuate mounting slot;

a connecting plate provided on the handle;

two driving arms and provided on the connecting plate and received in the mounting slot of the driven arm; and a snap ring secured on the drive shank and abutting the mounting sleeve of the driven arm; wherein:

the driving arms are located at two opposite ends of the connecting plate;

the drive shank has a periphery provided with a polygonal connecting portion;

the mounting sleeve of the driven arm has an interior provided with a polygonal mounting hole mounted on the connecting portion of the drive shank;

the control knob drives the switching member to pivot the pawl members so that one of the pawl members provides a oneway ratcheting function to the ratchet wheel of the drive shank, and the housing of the handle drives the ratchet wheel of the drive shank in one direction only so as to operate (screw or unscrew) a workpiece;

the mounting sleeve is located under the housing of the handle; and the snap ring is located under the mounting sleeve of the driven arm.

2. The socket wrench of claim 1, wherein:

the handle has a fixed length or has a telescopically adjustable structure;

the housing of the handle has an interior provided with a receiving chamber for receiving the ratchet wheel of the drive shank and provided with a receiving space for receiving the switching member, the pawl members and the elastic members;

the receiving space of the housing is connected to the receiving chamber; and the control knob is partially received in the receiving space of the housing.

3. The socket wrench of claim 1, further comprising a socket mounted on the drive shank, wherein the drive shank has a second end protruding outward from the housing of the handle, and the socket has a first end mounted on the second end of the drive shank and a second end mounted on the workpiece.

4. The socket wrench of claim 1, wherein:

the center of the ratchet wheel and one of the driving arms define a first line;

the center of the ratchet wheel and the other one of the driving arms define a second line; and the angle between the first line and the second line is ranged between fifteen and twenty-five degrees (15-25°).

5. The socket wrench of claim 1, wherein:

the center of the ratchet wheel and any one of the driving arms define a first length;

the handle has a second length; and the ratio of the first length and the second length is ranged between one eighth and one ninth (1/8-1/9).

* * * * *